United States Patent [19]

Harwood et al.

[11] 4,441,121
[45] Apr. 3, 1984

[54] ADJUSTABLE CORING CIRCUIT

[75] Inventors: Leopold A. Harwood, Bridgewater, N.J.; Robert L. Shanley, II, Indianapolis, Ind.

[73] Assignee: RCA Corporation, New York, N.Y.

[21] Appl. No.: 460,985

[22] Filed: Jan. 25, 1983

Related U.S. Application Data

[63] Continuation-in-part of Ser. No. 363,868, Mar. 31, 1982, abandoned.

[51] Int. Cl.³ .......................... H04N 9/535; H04N 5/14
[52] U.S. Cl. .......................................... 358/36; 358/31; 358/37
[58] Field of Search .................. 358/31, 36, 37, 39, 358/166, 167, 904, 315, 329; 307/260, 264; 328/167, 168, 169; 455/303, 304

[56] References Cited

U.S. PATENT DOCUMENTS

| | | | |
|---|---|---|---|
| 3,984,865 | 10/1976 | Avins | 358/36 |
| 4,071,782 | 1/1978 | Vidovic | 358/37 |
| 4,325,076 | 4/1982 | Harwood | 358/31 |

Primary Examiner—Tommy P. Chin
Attorney, Agent, or Firm—Eugene M. Whitacre; Paul J. Rasmussen; William H. Meagher

[57] ABSTRACT

Signals to be cored are applied to the inputs of a linear signal amplifier, and of a multistage limiting amplifier having cascaded input and output amplifying stages. A cored version of the signals, corresponding to the difference between a linearly translated version of the signals and a doubly clipped version thereof, is developed by a signal combiner responsive to the outputs of both amplifiers. A variable coring level control voltage controls the distribution of gain between the input and output amplifying stages, substantially without disturbing the overall gain of the limiting amplifier, which is set to match the overall gain of the linear amplifier. In an illustrative embodiment, the signals which are adjustably cored are horizontal peaking signals derived from the received luminance signal in a color television receiver. An automatic peaking control system associated with output of the adjustable coring circuit opposes changes in peaking level that might otherwise accompany coring level adjustment.

4 Claims, 3 Drawing Figures

ADJUSTABLE CORING CIRCUIT

This application is a continuation-in-part of U.S. patent application Ser. No. 363,868, filed Mar. 31, 1982, now abandoned. The present invention relates generally to signal coring circuits, and particularly to novel coring circuits of an adjustable type permitting control of the level of coring, with signal core removal accurately achieved at a plurality of different coring levels.

Coring of a signal (i.e., removing a close-to-average-axis "core" of the signal, by processing the signal with a translator exhibiting a transfer characteristic with a dead zone for close-to-axis signal excursions) is a known signal processing function, occasionally resorted to for noise reduction purposes, as explained, for example, in an article by J. P. Rossi, entitled "Digital Techniques for Reducing Television Noise", appearing on pages 134–140 of the March, 1978 issue of the SMPTE Journal. In certain uses of a coring circuit, a facility for adjusting the level of coring to be effected may be desired. The facility may permit manual adjustment of the coring level (as shown, for example, in an article by R. H. McMann, et al., entitled "Improved Signal Processing Techniques for Color Television Broadcasting", appearing on pages 221–228 of the March 1968 issue of the SMPTE Journal), or may provide for a dynamic adjustment of coring level (as shown, for example, in U.S. Pat. No. 4,167,749—Burrus, where a coring level is varied as a function of the level of noise detected as accompanying a video signal).

The present invention is concerned with the provision of a coring circuit of a type permitting coring level adjustment, but which avoids the needs for capacitive elements in its structure, and is conveniently and efficiently realizable in integrated circuit form.

In accordance with the principles of the present invention, a signal to be cored is applied to the input of a linear signal translator and to the input of a non-linear signal translator, the latter comprising a multistage limiting amplifier for developing a doubly limited version of the signals, and exhibiting an overall gain substantially equal to the gain exhibited by the linear signal translator. The limiting amplifier includes first and second signal amplifying stages coupled in cascade for signal amplification purposes. A signal combiner, responsive to outputs of the two signal translators, develops a cored version of the signals corresponding to the difference between a linearly translated version of the signals and a limited version of the signals. To achieve adjustment of the coring level, means are coupled to the cascaded amplifying stages of the limiting amplifier to alter the distribution of gain therebetween substantially without disturbance of the overall gain of the limiting amplifier.

In accordance with an illustrative embodiment of the present invention, the cascaded amplifying stages of the limiting amplifier comprise respective differential amplifiers, each deriving its operating current from the collector electrode of a respective current source transistor. The base-emitter paths of the respective current source transistors are connected in series across a common source of bias. Variation of a variable DC impedance connected in shunt with the base-emitter path of one of the current source transistors effects the desired coring level control. Illustratively, the variable DC impedance comprises the collector-emitter path of an additional transistor having an adjustably biased base-emitter junction.

In an illustrative use of the present invention, the signal which is subject to adjustable coring is a peaking signal derived from the luminance component of a television signal for use in enhancement of horizontal detail in an image reproduction. In such use of the invention, the adjustably cored peaking signal is desirably thereafter subject to the action of a closed loop automatic peaking control system so as to substantially preclude the adjustments of coring level from having undesired effects on the level of peaking attained.

Figure 1:
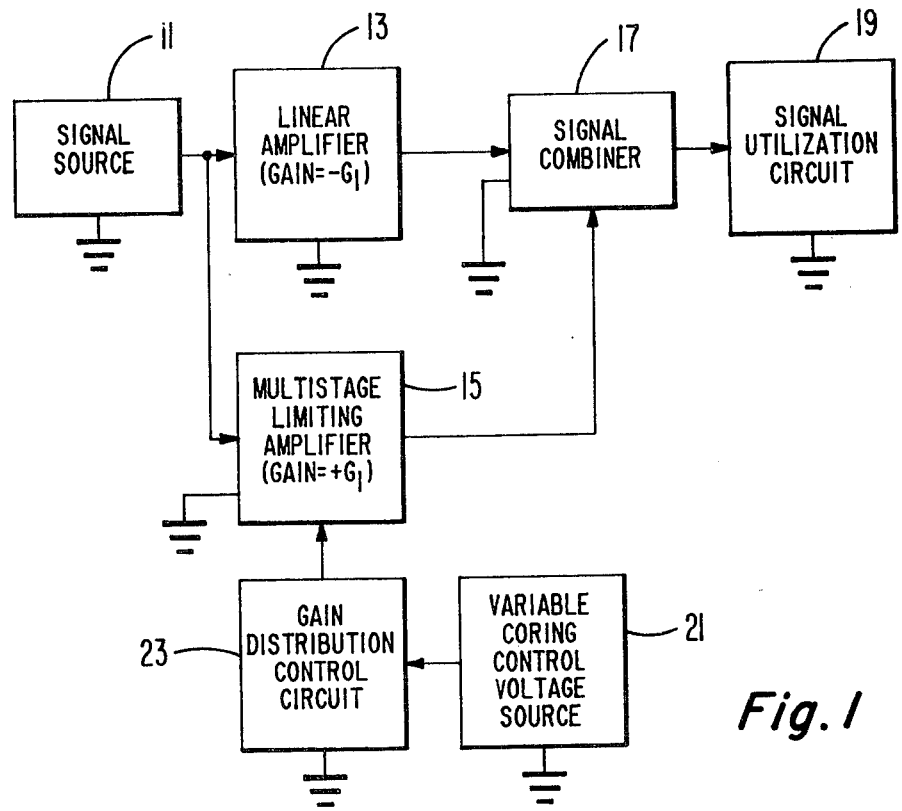
FIG. 1 illustrates, by block diagram representation, a coring circuit embodying the principles of the present invention.

In the system of FIG. 1, signals from a signal source 11 are supplied to the inputs of a linear amplifier 13 and of a multistage limiting amplifier 15. The magnitude of the overall gain ($+G_1$) provided by the multistage limiting amplifier 15 is equal to the magnitude of the gain ($-G_1$) of the linear amplifier 13. The outputs of the respective amplifiers are in antiphasal relationship, with the linear amplifier 13, illustratively, providing a net phase inversion, whereas the limiting amplifier 15 is noninverting.

The output of the linear amplifier 13 is a linearly translated version of the input signals, whereas limiting amplifier 15 serves as a non-linear signal translator providing a doubly clipped version of the input signals. Summing of the outputs of the respective amplifiers 13, 15 is effected in a signal combiner 17 to form a cored version of the input signals for delivery to a signal utilization circuit 19. The waveform of the cored signals delivered to utilization circuit 19 corresponds to the waveform of the input signals less its central, close-to-axis "core", which has been removed by cancellation in the combiner 17.

The distribution of gain between cascaded stages of the multistage limiting amplifier 15 is subject to adjustment by a gain distribution control circuit 23, in response to a control voltage developed by a variable coring control voltage source 21, substantially without disturbance of the overall gain of limiting amplifier 15. A convenient technique for so altering the distribution of gain between cascaded stages of a multistage amplifier is disclosed, for example, in our copending U.S. patent application, entitled "Amplifier Incorporating Gain Distribution Control For Cascaded Amplifying Stages", Ser. No. 363,869 filed on Mar. 31, 1982.

As the distribution of gain between cascaded input and output stages of amplifier 15 is altered in response to a variation of the control voltage supplied by source 21, the relative magnitude of the core subject to removal in combiner 17 is altered. That is, the depth or level of coring of the input signals is adjusted in response to a variation of the coring control voltage. A gain distribution change that elevates input stage gain results in a clipping by the output stage that is closer to the axis, and thus reduces the coring level. Conversely, a gain distribution change that depresses input stage gain increases the coring level. Maintenance of the overall gain of amplifier 15 substantially constant in the face of the gain distribution changes, however, assures the matching relationship between portions of the waveforms of the inputs to combiner 17 that is required for accurate cancellation therein so as to effect coring at the selected level.

Figure 2:
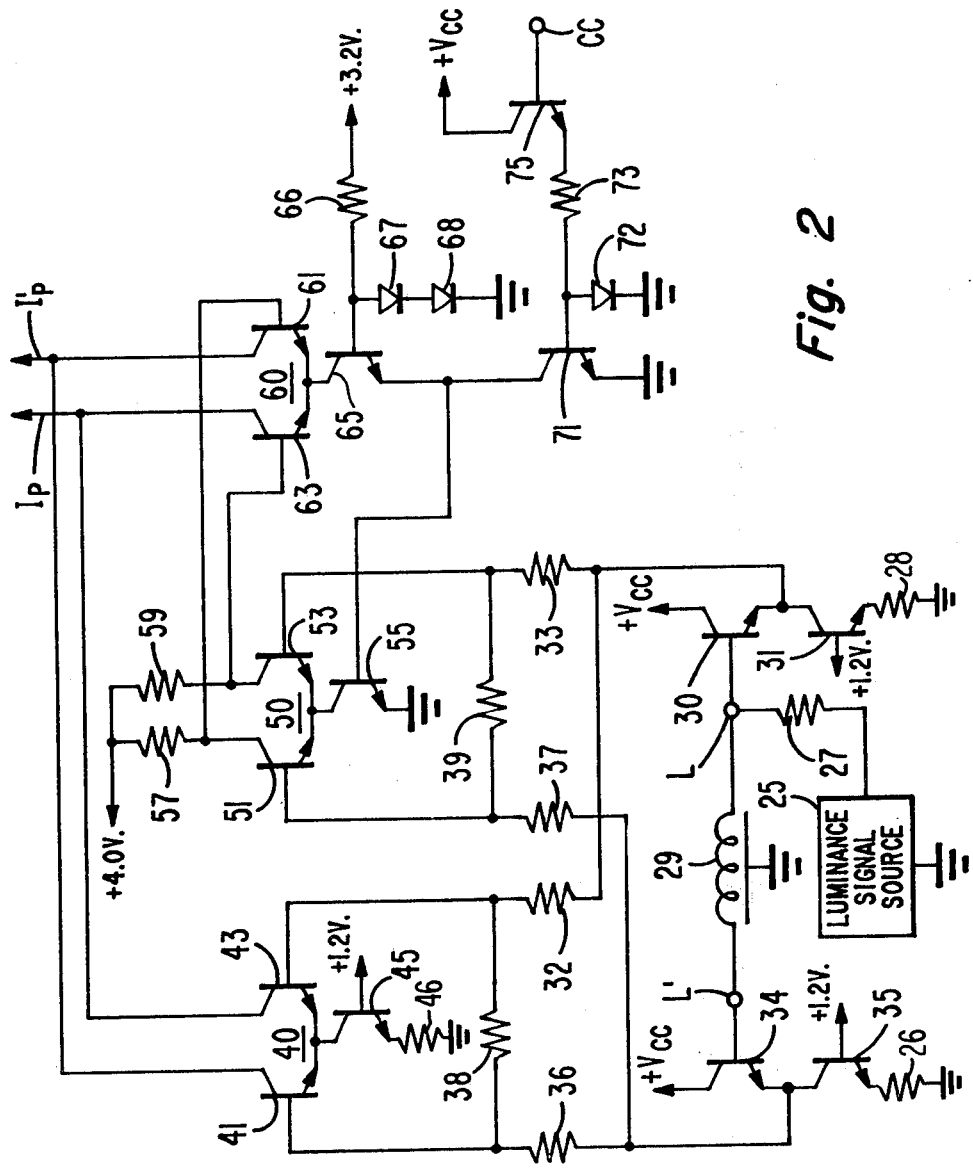
FIG. 2 illustrates, partially schematically and partially by block representation, an illustrative implementation of the coring circuit of FIG. 1 for achievement of adjustable coring of a peaking signal in a television receiver.

In FIG. 2, an illustrative embodiment of the coring system of FIG. 1 is shown in schematic detail, performing the function of adjustable coring of a horizontal peaking signal in a television receiver. In the FIG. 2 embodiment, a differential amplifier 40 serves as the linear amplifier of the FIG. 1 system, and differential amplifiers 50 and 60 serve as the cascaded input and output stages of the multistage limiting amplifier of the FIG. 1 system.

To develop the peaking signal which is to be processed by circuitry embodying the principles of the present invention, the output of a luminance signal source 25 (e.g., in a color television receiver use, constituted by the luminance signal output of the receiver's comb filter) is coupled via a resistor 27 to the input terminal (L) of a delay line 29. Illustratively, the delay line 29 is a wideband device exhibiting a linear phase characteristic over the frequency band occupied by the signals from source 25 (e.g., extending to 4.0 MHz.), and provides a signal delay of 140 nanoseconds. The input end of delay line 29 is terminated (e.g., through the aid of resistor 27) in an impedance substantially matching its characteristic impedance, whereas the output end of the delay line (at terminal L') is misterminated to obtain a reflective effect. The signals appearing at the respective ends of the delay line 29 are thus: (a) a once-delayed luminance signal at terminal L', and (b) the sum of an undelayed luminance signal and a twice-delayed luminance signal at terminal L. The difference between the respective signals at terminals L and L' corresponds to an appropriate horizontal peaking signal for addition to the luminance signal to enhance its horizontal detail (by effectively boosting luminance components in a frequency range from 1.75 MHz. to 5.25 MHz., −6 db points, with a maximum boost at 3.5 MHz.).

Differential amplifier 40, accepting signals from terminals L and L' at its respective differential inputs, provides a linear amplification channel for such a peaking signal. Amplifier 40 includes a pair of NPN transistors 41, 43 with interconnected emitter electrodes returned to a point of reference potential (e.g., ground) via the collector-emitter path of an NPN current source transistor 45 in series with emitter resistor 46. The base electrode of transistor 45 is connected to the positive terminal (+1.3 V.) of a bias potential supply to establish a desired operating current for amplifier 40.

Signals from terminal L' are supplied to the base electrode of transistor 41 via the base-emitter path of an NPN emitter-follower transistor 34 and a series coupling resistor 36. The collector electrode of transistor 34 is directly connected to the positive terminal (+Vcc) of an operating potential supply, while the emitter electrode of transistor 34 is returned to ground via the collector-emitter path of a current source transistor 35 (having its base electrode connected to the +1.2 V. bias supply terminal) in series with emitter resistor 26. Signals from terminal L are supplied to the base electrode of transistor 43 via the base-emitter path of an NPN emitter-follower transistor 30 and a series coupling resistor 32. The collector electrode of transistor 30 is directly connected to the +Vcc supply terminal, while the emitter electrode of transistor 30 is returned to ground via the collector-emitter path of a current source transistor 31 (having its base electrode connected to the +1.2 V. bias supply terminal) in series with emitter resistor 28. While direct connections are illustrated between the respective terminals L, L' and the bases of emitter-follower transistors 30, 34, additional emitter-followers (not shown) may desirably be interposed in the respective connections to elevate the impedances presented to the respective terminals.

A resistor 38 interconnects the base electrodes of transistors 41, 43, and cooperates with the coupling resistors 36, 32 to introduce a degree of attenuation of the input signals that ensures that the maximum signal difference between base potentials is accommodated within the linear signal handling range of amplifier 40. The respective collector electrodes of transistors 41 and 43 are linked to the positive terminal of an operating potential supply by respective loads (not shown) which are shared by the limiting amplifier's outputs. The respective collector currents of transistors 41 and 43 vary in accordance with oppositely phased versions of the peaking signals.

Differential amplifier 50, accepting signals from terminal L and L' at its respective differential inputs, serves as the input stage of a limiting amplifier providing a non-linear amplification channel for the peaking signal. Amplifier 50 includes a pair of NPN transistors 51, 53 with interconnected emitter electrodes returned to ground via the collector-emitter path of an NPN current source transistor 55. Signals from terminal L', appearing at the output of emitter-follower transistor 34, are supplied to the base electrode of transistor 51 via a series coupling resistor 37. Signals from terminal L, appearing at the output of emitter-follower transistor 30, are supplied to the base electrode of transistor 53 via a series coupling resistor 33. A resistor 39 interconnects the base electrodes of transistors 51 and 53. The input signal attenuation provided by the network of resistors 37, 39, 33 is less than the attenuation provided by the linear amplifier network (36, 38, 32), and permits the maximum signal swing between bases to exceed the linear signal handling range of amplifier 50.

The collector electrodes of transistors 51 and 53 are individually connected by respective load resistors (57, 59) to the positive terminal (+4.0 V.) of an operating potential supply. Oppositely phased peaking signals (with maximum excursions clipped) appear across the respective load resistors 57 and 59.

Differential amplifier 60, serving as the output stage of the limiting amplifier and providing further clipping of the peaking signals, includes a pair of NPN transistors 61 and 63 with emitter electrodes connected to the collector electrode of a current source transistor 65. The emitter electrode of transistor 65 is returned to ground via the base-emitter path of current source transistor 55. The base electrode of transistor 61 is directly connected to the collector electrode of transistor 51 of the input stage, while the base electrode of transistor 63 is directly connected to the collector electrode of transistor 53 of the input stage.

The collector electrode of transistor 61 is directly connected to the collector electrode of transistor 41 of the linear amplifier so that the summed collector currents of transistors 41 and 61 form a cored peaking signal current (Ip'). The collector electrode of transistor 63 is directly connected to the collector electrode of transistor 43 of the linear amplifier so that the summed collector currents of transistors 43 and 63 form a cored peaking signal current Ip (an oppositely phased version of Ip').

A resistor 66 is connected between the positive terminal (+3.2 V.) of a bias potential supply and the anode of a diode 67, the cathode of which is directly connected to the anode of a second diode 68. The cathode of diode 68 is directly connected to ground, so that the pair of diodes 67, 68 are forward biased by the bias potential supply. The anode of diode 67 is directly connected to the base electrode of current source transistor 65, so that the voltage appearing across the diode pair (67, 68) is applied across the serially disposed base-emitter paths of current source transistors 65, 55 to forward bias their base-emitter junctions.

The collector electrode of an additional NPN transistor 71 is directly connected to the base electrode of transistor 55. The emitter electrode of transistor 71 is directly connected to ground, disposing the collector-emitter path of transistor 71 directly in shunt with the base-emitter path of the input stage's current source transistor 55.

A coring control voltage input terminal CC is connected to the base electrode of an NPN emitter-follower transistor 75 (having its collector electrode directly connected to the +Vcc supply terminal). The emitter electrode of transistor 75 is connected via resistor 73 to the base electrode of transistor 71, and to the anode of a diode 72. The cathode of diode 72 is directly connected to ground, disposing diode 72 directly in shunt with the base-emitter path of transistor 71. A positive coring control voltage applied to terminal CC controls the biasing of transistor 71 to vary the conductance of its collector-emitter path and thereby adjust the level of coring attained in the output signal current Ip and Ip'. The variable coring control voltage may be provided by a manual control source (as in the aforementioned McMann, et al. article, for example) or a dynamic control source (as in the aforementioned Burrus patent, for example).

The base-emitter path of transistor 65 forms a voltage divider with the parallel combination of (a) the base-emitter path of transistor 55, and (b) the collector-emitter path of transistor 71, to effect a division of the bias voltage appearing across the series-connected diodes 67, 68, with the division ratio dependent upon the conductance of transistor 71. When the shunting impedance presented by transistor 71 decreases (due to an increase in the coring control voltage), the base-emitter voltage ($V_{be}$) of current source transistor 55 decreases, accompanied by a complementary increase of the base-emitter voltage of current source transistor 65. When the shunting impedance presented by transistor 71 increases (due to a decrease in the coring control voltage), the $V_{be}$ of transistor 55 increases, accompanied by a complementary decrease of the $V_{be}$ of transistor 65.

The consequence of a variation of the coring control voltage is thus an introduction of complementary variations in the operating currents of differential amplifiers 50 and 60, and, hence, complementary variations of the respective gains of the two cascaded stages of the limiting amplifier. With variations of the DC impedance presented by transistor 71 having a negligible effect on the bias voltage appearing across diodes 67, 68, the overall gain of the limiting amplifier, proportional to the product of the magnitudes of the respective stage's operating current, remains substantially undisturbed as the distribution of gain between respective stages is varied. For accuracy of coring, this undisturbed magnitude of overall gain is set so that the gains of the respective non-linear and linear amplification channels are substantially identical.

A gain distribution change (caused by a decrease in coring control voltage) that elevates input stage (50) gain results in a clipping by the output stage (60) that is closer to the axis, and thus reduces the coring level. Conversely, a gain distribution change (caused by an increase in coring control voltage) that depresses input stage gain increases the coring level.

Figure 3:
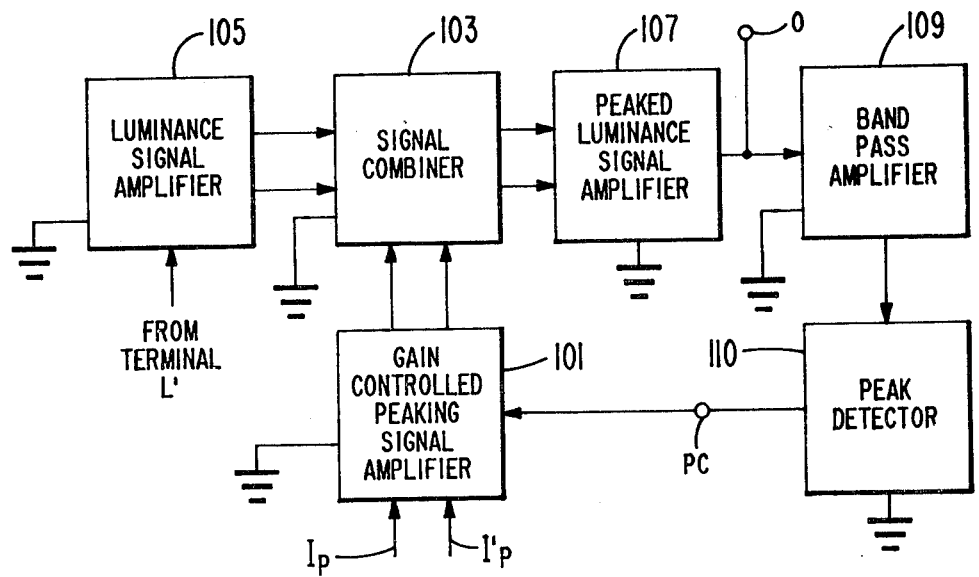
FIG. 3 illustrates, by block diagram representation, an automatic peaking control system with which the apparatus of FIG. 2 may desirably be associated.

FIG. 3 illustrates additional signal processing apparatus with which the peaking signal corer of FIG. 2 may be desirably associated. In FIG. 3, the (push-pull) cored peaking signal outputs (Ip and Ip') of the FIG. 2 system are supplied as signal inputs to a gain controlled peaking signal amplifier 101. Amplifier 101 translates the cored peaking signals with a gain (or attenuation) determined by a control voltage applied to a peaking control terminal PC.

The push-pull outputs of amplifier 101 are summed with the push-pull outputs of a luminance signal amplifier 105, responsive to the delayed luminance signals at terminal L' (FIG. 2), in a signal combiner 103 to form push-pull versions of a peaked luminance signal for application to a peaked luminance signal amplifier 107. Amplifier 107 converts the push-pull peaked luminance signal inputs to single-ended form at output terminal O, from which terminal the peaked luminance signal may be delivered, for example, to a color receiver's matrix circuits for combination with respective color-difference signals.

The output of amplifier 107 is also applied to the input of a bandpass amplifier 109 for automatic peaking control purposes. Illustratively exhibiting a passband of approximately 1 MHz. bandwidth centered about a frequency of approximately 2 MHz., amplifier 109 delivers the components of the peaked luminance signal falling within its passband to a peak detector 110, which develops a control voltage proportional to the amplitude of the delivered components. This control voltage is applied to terminal PC to control the magnitude of the peaking signals supplied to combiner 103 in a sense opposing changes in the amplitude of said delivered components. Reference may be made to a copending U.S. patent application, Ser. No. 310,139, filed Oct. 9, 1981 for a more detailed explanation of the operation of such an automatic peaking control system, and examples of advantageous circuitry for implementing the functions of the elements 101, 103, 105, 107, 109 and 110 (as well as associating a manual peaking control therewith).

An advantage of associating the apparatus of FIG. 3 with the adjustable coring system of FIG. 2 resides in the substantial avoidance of any adverse effects on peaking level when the coring level is adjusted. To illustrate this point, consider, for example, that a coring control voltage change is made to increase the coring level for purposes of increased removal of noise components from the peaking signal outputs of the FIG. 2 system. One accompanying consequence of such a greater core removal is a reduction of the amplitude of the retained peaking signal components in outputs Ip and Ip'. The automatic peaking control system of FIG. 3, however, will tend to oppose any weakening of peaking effects that such amplitude reduction might otherwise cause by introducing a compensatory change in the gain of amplifier 101.

An illustrative set of values for circuit parameters of the FIG. 2 system is, as follows:

Resistors 26, 28: 2 kilohms
Resistor 27: 680 ohms
Resistor 32, 36: 2.4 kilohms
Resistors 33, 37: 470 ohms
Resistor 38: 1000 ohms
Resistor 39: 4.7 kilohms
Resistors 46, 57, 59: 500 ohms
Resistor 66: 13.3 kilohms
Resistor 73: 25 kilohms
Potential (+Vcc): 11.2 volts

What is claimed is:

1. A system for effecting an adjustable amount of coring of signals derived from a source comprising:

first signal translating means, having an input coupled to said source, for linearly translating said signals;

second signal translating means, having an input coupled to said source, for non-linearly translating said signals; said second signal translating means comprising a multistage limiting amplifier for developing a limited version of said signals, said limiting amplifier including first and second signal amplifying stages coupled in cascade, and exhibiting an overall gain substantially equal to the gain exhibited by said first signal translating means;

means, responsive to the outputs of said first and second signal translating means, for developing a cored version of said signals corresponding to the difference between a linearly translated version of said signals and a limited version of said signals; and means, coupled to said first and second signal amplifying stages, for selectively altering the distribution of gain between said first and second signal amplifying stages substantially without disturbance of said overall gain of said limiting amplifier.

2. Apparatus in accordance with claim 1 wherein one of said signal translating means, to the exclusion of the other, subjects said signals to a net phase inversion, and wherein said cored signal developing means comprises means for summing outputs of said first and second signal translating means.

3. Apparatus in accordance with claim 1, for use with a source of luminance signals, wherein the signals translated by said first and second signal translating means comprise peaking signals derived from said luminance signal source.

4. In a television receiver including a source of luminance signals, apparatus comprising, in combination:

a delay line having its input coupled to said source of luminance signals;

a linear signal translator; said linear signal translator comprising a first differential amplifier having a pair of inputs coupled to be responsive to signals appearing at the input of said delay line, and to signals appearing at the output of said delay line, respectively;

a non-linear signal translator; said non-linear signal translator comprising a limiting amplifier including second and third differential amplifiers coupled in cascade, said second differential amplifier having a pair of inputs coupled to be responsive to signals appearing at the input of said delay line, and to signals appearing at the output of said delay line, respectively;

means, coupled to said second and third differential amplifiers, for simultaneously varying the gains of said second and third differential amplifiers in mutually opposite directions; the overall gain of said non-linear signal translator being independent of the operation of said gain varying means and substantially equal to the gain of said linear signal translator;

means for combining the outputs of said linear signal translator and said non-linear signal translator to form a cored peaking signal, with the level of coring dependent upon the operation of said gain varying means.

* * * * *